United States Patent [19]

Omar

[11] 4,233,908
[45] Nov. 18, 1980

[54] CONSTRUCTION OF REACTOR-DRIVEN ARTICULATED TRAINS WITH ELEVATED TRACKS

[76] Inventor: Alejandro G. Omar, Avda. del Generalisimo 4, Madrid-16, Spain

[21] Appl. No.: 973,905

[22] Filed: Dec. 28, 1978

[51] Int. Cl.³ .............................................. B61D 17/00
[52] U.S. Cl. ......................................... 105/3; 104/89; 104/95; 105/8 R
[58] Field of Search ..................... 105/3, 2 R, 17, 144, 105/180, 344, 345, 8 R, 15, 18; 104/89, 124–130, 131, 247, 147 R

[56] References Cited

U.S. PATENT DOCUMENTS

| | | | |
|---|---|---|---|
| 1,039,585 | 9/1912 | Pascal | 105/3 |
| 3,626,857 | 12/1971 | Omar | 104/89 |
| 3,630,153 | 12/1971 | Gvimarin | 105/2 R |
| 3,774,542 | 11/1973 | Walsh | 104/147 R |

*Primary Examiner*—Richard A. Bertsch

[57] ABSTRACT

The present invention relates to improvements in the construction of reactor-driven articulated trains with elevated track, consisting of an indefinite succession of modular rings of circular, prismatic, eliptical or similar section, of suitable dimensions, equipped with flanges folded inwards in such a way that the said rings are longitudinally joined, placing between them an elastic joint of the same profile as the rings, in one or more pieces, making possible a perfect articulation of the rings on curves of any radius, in this way forming a clear tubular unit that is extremely flexible and deformable, which can be hauled by a reactor motor element, resting on pneumatic sliding wheels; in the interior of the tubular unit a floor is made and seats for passengers are suitably arranged and which are provided with means of tilting that make it possible to absorb the centrifugal forces developed in relation to the speed and the radius of the curves of the elevated track rails, with elimination of cant in the said rails.

11 Claims, 6 Drawing Figures

CONSTRUCTION OF REACTOR-DRIVEN ARTICULATED TRAINS WITH ELEVATED TRACKS

The purpose of this invention is to improve the conditions of travel of articulated trains that run on elevated structures by equipping them with possibilities of reaching speeds not reached up to now, with full assurance of not becoming derailed, with the special feature that the load assumed to be concentrated on one point of the wheel of a loaded train does not exceed three hundred kgm, which means that the structures of the track can be reduced to a marked extent, with consequent reduction of costs of the infrastructure and the superstructure, as well as of operating costs. This invention develops a new concept in the construction of trains which relates to the coach, or the clear space intended for passengers or freight, and which consists of an indefinite succession of identical tubular rings, preferably cylindrical, prismatic or elliptical, whose maximum diameter is between two and three meters, while their length is between half a meter and one meter. The said rings have on their extremities a number of flanges turned inward to facilitate union between the modular rings, with the interposition of elastic joints that permit tractions and contractions, being joined to the flanges of contiguous modules and in all or part of their perimeter by means of suitable fixing elements which provide a high articulation coefficient, making it possible for the train to travel at high speed through curves of small radius.

The modular coaches of the train, in accordance with the invention, have numerous advantages among which the following should be emphasized:

(a) Classic vehicles are eliminated, both of conventional trains and of non-conventional trains, to form a train with a succession of small articulated rings, practically converting it into a flexible tube, totally adaptable to any curve, however small.

(b) The load concentrated on one point per wheel with a loaded train is reduced to a very great degree, to one-tenth with respect not now to conventional trains that record up to 12,000 kgs. per wheel, but also with respect to the non-conventional trains known which record minimum loads of 2,000 kgs., since in this train the said load per wheel is approximately 200 to 300 kgs.

(c) The clearance of this train is such that in addition to the small space it occupies, it allows for easy and economical tunnel drilling and unusual stretches, these works being reduced to drillings usual in hydraulic systems and in mining, with construction progress of from 60 to 80 meters per day.

(d) A great economy in mass construction of the modular rings, as well as the complementary elements of the complete unit, and in operating costs.

The influence of the above-mentioned load on one point on the costs of superstructure or infrastructure, fixed or civil engineering works, such as bridges, unusual stretches, etc., which at times represent up to 60 to 65% of the total cost of establishment, is reduced to approximately one-tenth.

Total use in this train of the interior useable space of the coaches for passengers and distributable loads, because of the elimination of hooks, recesses, and separations between them, makes it possible to cope with large capacity transport of passengers, all seated. It is calculated that it is possible to arrange 250 seats in a 100 meter train.

The motor element consists of a vehicle equipped with one or more turbo-reactors as the driving means, which makes it possible for the train to reach high commercial speeds, unthought-of up to now, such as, for example 400 km/hour, and which are possible for the train since its speed ceiling is theoretically unlimited because of the characteristic of the train that it cannot be derailed, practically eliminating adhesion coefficients between wheels and rails, with the consequent advantages in maintenance and traction.

For the purpose of eliminating the effects of centrifugal force on the passengers, since the track structure has no cant, individual seats joined back-to-back by the back of the seats, are suspended from a pivot, which allows for appropriate tilting on curves.

The rings or modules of the train may be constructed from suitable plastic materials appropriately reinforced, or from light metals, or from mixed structural compounds, with support wheels being placed on rails between every two modules, consecutive or not, each of which wheels rests individually on a suitable support bearing. In addition other wheels are provided in horizontal arrangements to rest on the inner vertical faces of the track structure to keep the train free from transverse movements or rolling movements, ensuring that it cannot be derailed.

It should be pointed out that the support wheels may be substituted by sliding runners since, as has been said before, the adhesion coefficient between wheels and rails is practically nil.

In general, the rings or modules are of two basic types, one having two seats in its interior and the other, which is for access, which is placed between the above-mentioned modules, suitably alternated.

The driving element or locomotive is constituted by modular rings similar to those of the train to form an articulated unit in which the control cab is set up and in which fuel stores, auxiliary equipment, batteries, loads and baggage, etc. are situated. The said locomotive is driven by one or more turbo-reactors, preferably two, with frontal air intakes, arranged in order on a special module and with the possibility of concealing the said turbo-reactors in order to reduce the clearance and to facilitate passage of the unit through tunnels and unsual stretches, as well as through cities, in some cases taking advantage of the inertia acquired by stopping the turbo-reactors for their concealment, or applying secondary driving means for low speeds or starting.

In general turbo-propellers may be applied in cities and for low speeds.

The turbo-reactors are mounted on the deck of the special module with the possibility of being appropriately orientated, and are equipped with gas deflectors in order to aid the stability of the train on curves and in starting or during running.

In order to facilitate the most exact interpretation of the subject of this patent application, the complementary drawings attached hereto represent a practical form of industrial embodiment and only by way of example and, therefore, without being exhaustive but merely informative.

Figure 1:
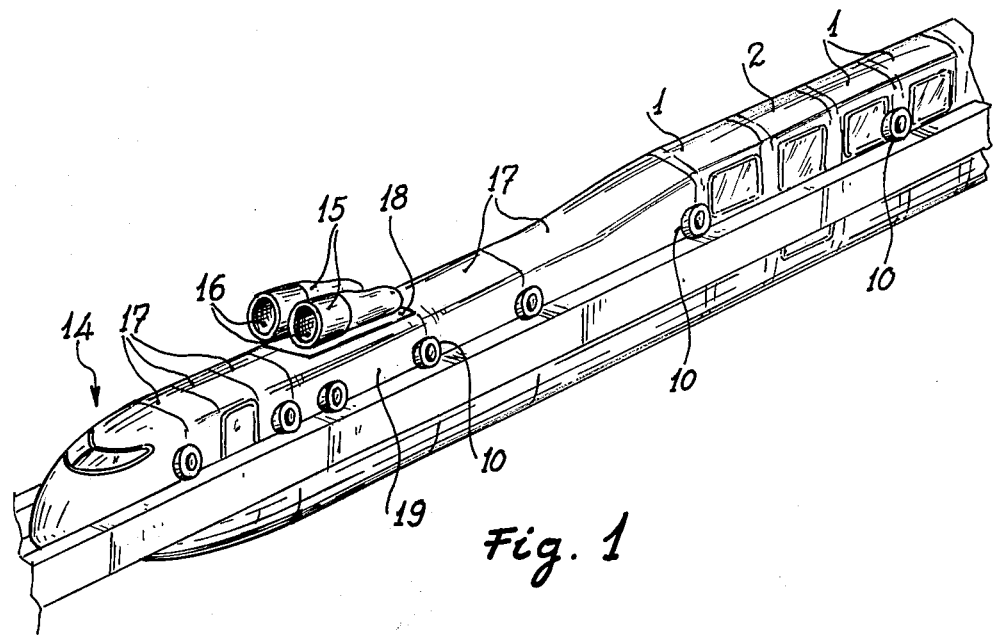
FIG. 1 represents a general view of the train in accordance with the invention.
Figure 2:
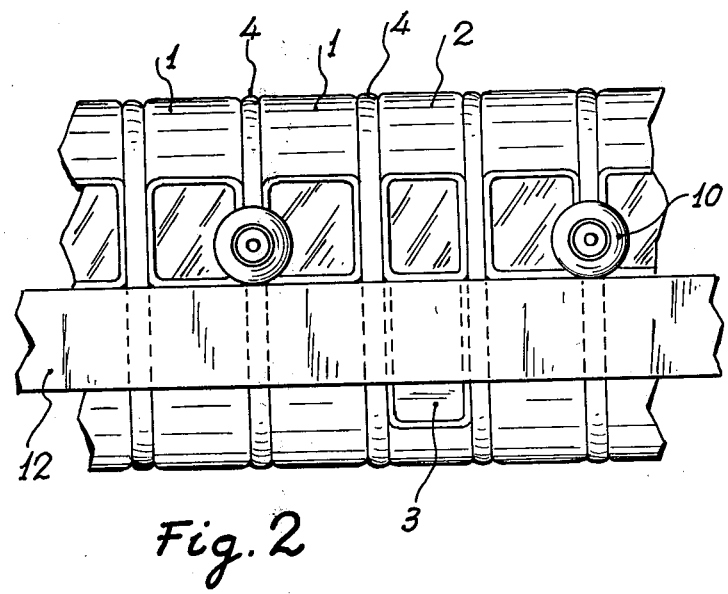
FIG. 2 is a lateral view of the arrangement of the modules.
Figure 3:
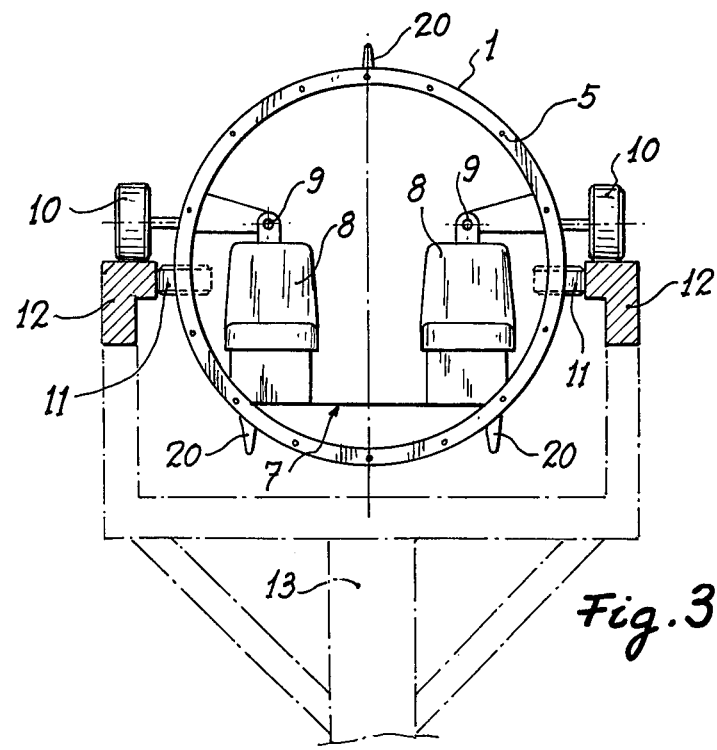
FIG. 3 is a transverse view of a module.
Figure 4:
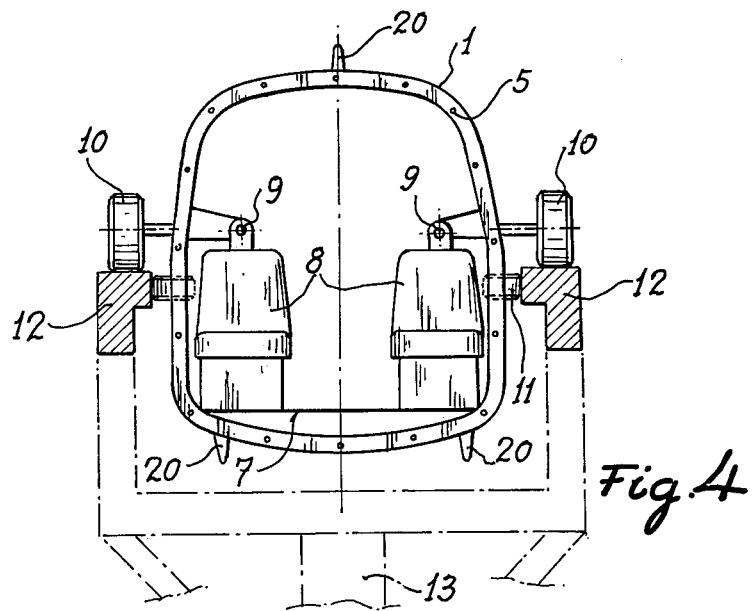
FIG. 4 is a transverse view of a variant of the module.
Figure 5:
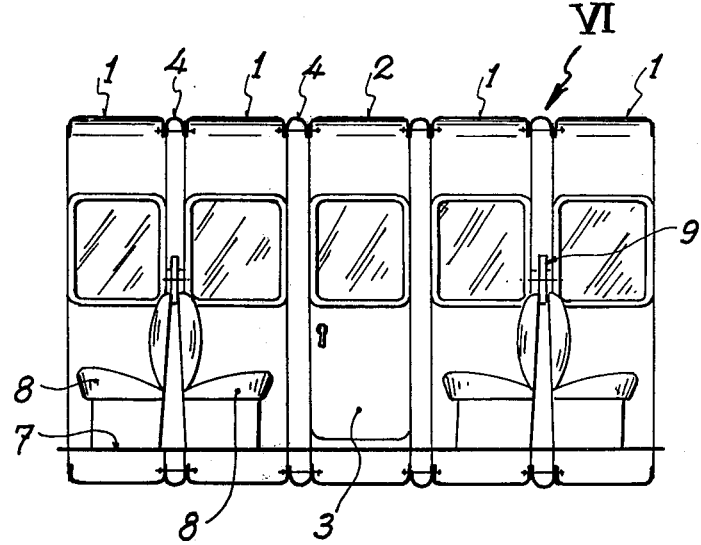
FIG. 5 is a longitudinal section of arrangement of the modules.
Figure 6:
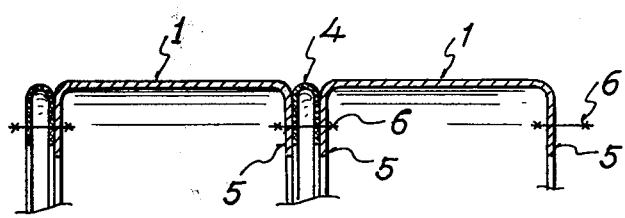
FIG. 6 illustrates a detail of the coupling between modules.

In accordance with the invention, the train that is the subject of this patent application consists of an indefinite succession of modular rings (1) and (2) of circular, FIG. 3, prismatic, FIG. 4, and even elliptical section, of suitable dimensions, generally with maximum diameter or axis of about two meters, coaxially joined, FIGS. 1, 2 and 5, with the interposition of an elastic joint (4) mounted between flanges (5) folded inwards on their periphery on both ends of the modules (1 and 2) and fixed by means of suitable elements (6), making possible the articulation of the train formed in this way.

The said modular rings (1 and 2) may have a length of approximately half a meter, with which the possibility of articulation is very great, allowing the train to travel on curves of small radius at high speed, since its constitution is similar to a tubular conduit, very flexible because of the short length of its modular rings, of which there are mainly two types, one indicated with the number (1) of closed perimeter, with windows opposite one another, and a second type (2) an access module, equipped with workable doors (3) for the entrance of passengers and which are placed between two closed modules (1) in a suitable sequence, one to every two closed modules (1) being considered optimum.

In these modules (1 and 2) a floor (7) is formed or flooring is duly laid down, under which there may be electric circuits, circuits for heating, brakes, fuel, air conditioning, etc., without the upper habitable part losing functional space.

In these closed modules (1) two seats (8) are installed, one on each side, leaving a coaxial central passage so that by placing an access module (2) between every two of these modules (1), the free space permits passage to the interior at the same time that it provides a kind of habitable space for the passengers who occupy the nearly seats.

The closed modules (1) are joined so that the backs of the relevant seats (8) are joined through the back of the seat in such a way that each pair of seats (8) can be suspended on a suitable articulation (9), in these conditions, when the train travels through curves not provided with cant, which they would otherwise need, the centrifugal force developed causes tilting of the seats, in this way providing a completely comfortable rest.

The train advocated rests on a series of wheels (10), generally pneumatic, that slide on beam rails (12) that are part of an elevated structure (13), the shafts of the said sliding wheels (10) are mounted on suitable bearings not represented in the drawings, situated between the flanges (5) of two consecutive modular rings (1) and at both sides, another set of wheels (11) is also provided, preferably on the same point, that act on the inner sides of the beam rail (12) as retention elements, making the train practically impossible to derail, at the same time that all possibility of rolling movement is eliminated since in the mounting of the said retention wheels (11) elastic means are provided to keep them in permanent contact with the rail beams (12).

The said sliding wheels (10) which optionally may be substituted by sliding runners, as well as the retention wheels (11), are distributed along the length of the train, placed between a predetermined number of modular rings, the lower part of the latter being always in a position notably lower than the points of contract of the means of support on the rails, so that the centre of gravity of the whole unit is situated approximately at the same level as the running rails (12), in this way providing ansolute stability of the train even when running at high speed.

Generally, the modular rings (1 and 2) will be made of plastic materials or light metals so that their unit weight is very small. It is calculated that with a loaded train a load of some three hundred kilograms concentrated on one point will weigh on each wheel, in this way obtaining a great reduction in weight, not now with respect to conventional trains, but a weight that is markedly lower in comparison with the most modern trains known, which record minimum weights of 2,000 kgs.

The influence of the above-mentioned load on one point on the costs of the superstructures and infrastructures of the track which at times represent up to 60 or 65% of the total costs of establishment, are considerably reduced, to approximately one-tenth.

The train constituted in this way is hauled by a tractor vehicle or locomotive (14) consisting of a modular element (17) of structure similar to the rings (1 and 2) of the train, so that on the one hand an articulated control cab can be set up and on the other hand a series of compartments for fuel, auxiliary equipment, battery, loads, etc. The said locomotive (14) is driven by driving equipment consisting of one or more turbo-reactors (15) with air intake (16) in a frontal position, and situated on top of the deck of the locomotive and with the possibility of being concealed; for this the said turbo-reactors (15) preferably two, are fixed to the deck (18) of a special driving module (19) which deck (18) may be vertically displaced into the interior of the relevant modules (19), concealing the turbo-reactors (15) that have been previously switched off. This possibility of concealment makes it possible on certain occassions to reduce the clearance of the motor vehicle or locomotive (14) such as when passing through tunnels, accesses to stations, routes through cities, etc., in addition the momentary switching-off of the turbo-reactors avoids conditions of pollution in the vicinity of station centres, tunnels, and other special places, by taking advantage of the inertia created in the train, so that the train continues running at high speed, as long as it does not have to stop in stations, since, as has been said before, the switching off of the reactors is momentary, taking into account the fact that possible tunnels on the route may be short in length since, because of the high motor performance, it is possible to ascend high slopes, reaching very high levels of land.

On the other hand, the turbo-reactors (15) are mounted on the removable deck (18) with the possibility of being suitably orientated, and of being equipped with gas deflectors in order to help the stability of the train on curves and in starting or during running. In the case of necessity, the locomotive may carry aerodynamic stabilizing devices. In trains for urban use and low speeds the turbo-reactors (15) may be replaced by turbo-propellers although in this case they would have to be coupled to a differential system acting on the driving wheels.

In any case, the inclusion of a reactor (15) of suitable power, endows the train with speeds not known up to now, practically unlimited, although subject to the mechanical conditions of the materials used, being able to reach up to 400 km/hour at cruising speed, independently of the layout of the line since, because of the articulation possibilities of the train and its mounting on the track structure (12) it is practically impossible to derail it.

It only remains to add that in the case, for example, of stations where the elevated structure may be eliminated, and therefore the beam rails (12), in order to allow the entrance and exit of passengers through the doors (13), the modules may slide and be guided by means of flanges (20) situated on the upper or lower part of each module which slide in the interior of a number of guide elements provided for the purpose.

What is claimed is:

1. A reactor-driven articulated rail train having a single, tubular, flexible body unit, said body unit comprising:
   a plurality of rigid rings, the openings of said rings defining the internal cross-section of said body unit;
   elastic joint means comprising a plurality of load-carrying flexible rings having substantially the same opening dimensions as said rigid rings, said body unit being a continuous tubular assembly of said plurality of rigid rings alternating with and joined by said plurality of flexible rings, thereby rendering said tubular unit incrementally flexible;
   support means including a plurality of elements adapted to move along train rails, said elements being spaced along said body unit supporting the weight thereof;
   a plurality of seats in said tubular body unit; and
   mounting means for attaching said seats to said tubular unit, said mounting means permitting said seats to tilt with respect to said body unit about an axis parallel to the longitudinal axis of said body unit in response to centrifugal force applied to said train.

2. A reactor-driven articulated train as claimed in claim 1, wherein a portion of said train includes locomotive element comprising:
   driving means consisting of at least one turbo-reactor engine having air intake and exhaust;
   a movable deck, said driving means being mounted on said deck with said air intake generally frontal to said train, said movable deck providing for positioning and orienting said driving means on the top of said body unit and being movable to retract said driving means completely within said body unit.

3. A reactor-driven articulated train as claimed in claim 1, wherein: some of said plurality of rigid rings are provided with doors for access to the interior of said body unit; and the remainder of said plurality of rigid rings are modules containing said seats.

4. A reactor-driven articulated train as claimed in claim 3, wherein said seats are located in back-to-back pairs aligned to face parallel to the axis of said tubular body, the backs of said pairs of seats being joined, and said pairs of seats being suspended through the joined backs from a pivot.

5. A reactor-driven articulated train as claimed in claim 4, wherein each of said ring modules containing seats adjoins another module containing seats and each of said seat-containing modules has two seats side by side, backs of the seats of each said seat-containing module being joined to the backs of seats in said adjoining seat-containing module through said pivot, said pivot being fixed between said rigid rings.

6. A reactor-driven train as claimed in claim 3, wherein each of said modules containing seats is provided with windows.

7. A reactor-driven train as claimed in claim 1, wherein a plurality of horizontal wheels is spaced along said body unit at the same points as said elements of said support means, said support elements arranged to move along two parallel train rails, and said horizontal wheels being spaced so as to bear against the vertical surfaces of the insides of the two rails, thereby preventing lateral motion of said body unit with respect to said rails.

8. A reactor-driven train as claimed in claim 1, wherein said elements of said support means are load supporting wheels.

9. A reactor-driven train as claimed in claim 1, wherein: the axial ends of said rigid rings are provided with inwardly-turned flanges; and said flexible joint means is a U-shaped channel section, the legs of said section being secured to said flanges.

10. A reactor-driven train as claimed in claim 1, wherein said elements of said support means are located generally on the sides of said tubular body, said body being carried between two rails.

11. A reactor-driven train as claimed in claim 10, wherein at least some of said rigid rings are provided with external flanges on the lower portion of said rigid rings said external flanges being linear and extending parallel to the axis of said tubular body, said linear flanges being adapted to support the weight of said train and to guide said train when engaged in suitable guideways at low speeds, whereby the rails may be interrupted at stations so as to facilitate access to said body.

* * * * *